(12) United States Patent
Qiu et al.

(10) Patent No.: US 11,086,408 B2
(45) Date of Patent: Aug. 10, 2021

(54) KEYPAD

(71) Applicant: HuiZhou TCL Mobile Communication Co., Ltd., HuiZhou (CN)

(72) Inventors: Zhuwei Qiu, HuiZhou (CN); Bin Luo, HuiZhou (CN); Xu Wang, HuiZhou (CN); Fan Huang, HuiZhou (CN); Xingchun Chen, HuiZhou (CN); Shengfang Qiu, HuiZhou (CN); Yong Zeng, HuiZhou (CN)

(73) Assignee: HuiZhou TCL Mobile Communication Co., Ltd., HuiZhou (CN)

( * ) Notice: Subject to any disclaimer, the term of this patent is extended or adjusted under 35 U.S.C. 154(b) by 10 days.

(21) Appl. No.: 16/620,511

(22) PCT Filed: Jan. 17, 2018

(86) PCT No.: PCT/CN2018/073015
§ 371 (c)(1),
(2) Date: Dec. 8, 2019

(87) PCT Pub. No.: WO2018/223703
PCT Pub. Date: Dec. 13, 2018

(65) Prior Publication Data
US 2021/0096654 A1    Apr. 1, 2021

(30) Foreign Application Priority Data

Jun. 8, 2017    (CN) .......................... 201710425874.5

(51) Int. Cl.
*G06F 3/02*    (2006.01)
*H04B 1/3818*  (2015.01)
*G06F 3/023*   (2006.01)

(52) U.S. Cl.
CPC ............ *G06F 3/021* (2013.01); *G06F 3/0231* (2013.01); *H04B 1/3818* (2015.01)

(58) Field of Classification Search
CPC ...... G06F 3/021; G06F 3/0231; H04B 1/3818
(Continued)

(56) References Cited

U.S. PATENT DOCUMENTS 9,769,867 B2 *  9/2017  Ramkumar ....... H04W 72/1273
9,877,275 B2 *  1/2018  Korneluk ............... G01S 19/34
(Continued)

FOREIGN PATENT DOCUMENTS

CN    202133963    2/2012
CN    105450799    3/2016
(Continued)

OTHER PUBLICATIONS

International Search Report and Written Opinion dated Apr. 9, 2018 from the International Searching Authority Re. Application No. PCT/CN2018/073015 with an English Translation of the Search Report. (10 pages).

*Primary Examiner* — Calvin C Ma

(57) ABSTRACT

A keypad is provided in the present invention. The keypad includes a keypad shell and a keypad circuit board provided within the keypad shell. The keypad shell is provided with at least two subscriber identity module (SIM) card sockets and a first communication module connected to the SIM card sockets and configured to access the Internet. A SIM card switch is provided between the first communication module and the SIM card sockets. Compared to the prior art, the present invention enables, by means of providing the keypad with the at least two SIM card sockets and the first communication module supporting all major operators, the keypad to access the Internet when connected to a mobile terminal, and ensures uninterrupted Internet data access by (Continued)

switching to a SIM card of a different operator when the SIM card of the current operator has weak reception.

17 Claims, 2 Drawing Sheets

(58) Field of Classification Search
USPC .................................................. 345/168, 173
See application file for complete search history.

(56) References Cited

U.S. PATENT DOCUMENTS

| | | | |
|---|---|---|---|
| 10,568,073 B2* | 2/2020 | Pathak | H04W 76/10 |
| 2008/0018543 A1* | 1/2008 | Baliarda | H01Q 9/0407 |
| | | | 343/702 |
| 2011/0070921 A1* | 3/2011 | Karaoguz | H04W 88/06 |
| | | | 455/552.1 |
| 2014/0274210 A1 | 9/2014 | Tsai et al. | |
| 2019/0120805 A1* | 4/2019 | Kwak | G01N 1/2273 |

FOREIGN PATENT DOCUMENTS

| | | |
|---|---|---|
| CN | 106488440 | 3/2017 |
| CN | 206181011 | 5/2017 |
| CN | 107300981 | 10/2017 |
| WO | WO 2018/223703 | 12/2018 |

* cited by examiner

KEYPAD

RELATED APPLICATIONS

This application is a National Phase of PCT Patent Application No. PCT/CN2018/073015 having International filing date of Jan. 17, 2018, which claims the benefit of priority of Chinese Patent Application No. 201710425874.5 filed on Jun. 8, 2017. The contents of the above applications are all incorporated by reference as if fully set forth herein in their entirety.

FIELD AND BACKGROUND OF THE INVENTION

The present disclosure relates to the field of peripheral equipments of mobile terminals, and more particularly, to a keypad.

With development of technologies, all walks of life have advanced by leaps and bounds. The electronics industry is related to people's daily life, so it is difficult to estimate its variety and range of products.

As screen sizes of mobile terminals increase, the mobile terminals can replace traditional computers in some range. However, most mobile terminals are disposed with virtual keypads, which make the mobile terminals inconvenient to use, and some mobile terminals do not have functions of Internet access, therefore they have to access the Internet through wireless hotspots or other ways when they are used. Besides, some mobile terminals with hotspots only support one card, so that they cannot work very well when they work in some areas with weak signals.

SUMMARY OF THE INVENTION

An object of the present disclosure is to provide a keypad to realize Internet access.

To achieve the above object, an embodiment of the present disclosure provides a keypad. The keypad includes a keypad shell, and a keypad circuit board disposed inside the keypad shell. Two subscriber identity module (SIM) card sockets, and a first communication module configured to access the Internet and connected to the two SIM card sockets are disposed in the keypad shell, and a SIM card switch is coupled between the first communication module and the two SIM card sockets, which realizes Internet access of the keypad and switching between SIM cards. A second communication module configured to communicate with a mobile terminal is disposed on the keypad circuit board, and the keypad circuit board is connected to the first communication module. A dustproof cover covers two SIM card holes disposed in the keypad shell and corresponding to the two SIM card sockets disposed in the keypad shell, and a rectangular hole disposed outside the two SIM card holes and connected to the two SIM card holes fits the dustproof cover.

In an embodiment of the present disclosure, a connector disposed on a surface of the keypad shell is connected to the keypad circuit board and the first communication module, which enables the mobile terminal to access the Internet by a wired mode and be connected to the keypad.

In an embodiment of the present disclosure, the connector is a pogo pin.

In an embodiment of the present disclosure, the first communication module is a fourth generation of mobile phone mobile communication technology standards (4G) module.

In an embodiment of the present disclosure, the second communication module is selected from a BLUETOOTH module, a WIFI module, and a BLUETOOTH and WIFI module.

In an embodiment of the present disclosure, the two SIM card holes are disposed on an edge of a backend of the keypad shell.

An embodiment of the present disclosure further provides a keypad. The keypad includes a keypad shell, and a keypad circuit board disposed inside the keypad shell. Two subscriber identity module (SIM) card sockets, and a first communication module configured to access the Internet and connected to the two SIM card sockets are disposed in the keypad shell, and a SIM card switch is coupled between the first communication module and the two SIM card sockets, which realizes Internet access of the keypad and switching between SIM cards.

In an embodiment of the present disclosure, two SIM card holes corresponding to the two SIM card sockets are disposed in the keypad shell.

In an embodiment of the present disclosure, a dustproof cover covers the two SIM card holes, which achieves dust prevention.

In an embodiment of the present disclosure, the two SIM card holes are disposed on an edge of a backend of the keypad shell.

In an embodiment of the present disclosure, a connector disposed on a surface of the keypad shell is connected to the first communication module, which enables the mobile terminal to access the Internet by a wired mode.

In an embodiment of the present disclosure, the connector is a pogo pin.

In an embodiment of the present disclosure, the first communication module is a fourth generation of mobile phone mobile communication technology standards (4G) module.

An embodiment of the present disclosure further provides a keypad. The keypad includes a keypad shell, and a keypad circuit board disposed inside the keypad shell. Two subscriber identity module (SIM) card sockets, and a first communication module configured to access the Internet and connected to the two SIM card sockets are disposed in the keypad shell, and a SIM card switch is coupled between the first communication module and the two SIM card sockets. A second communication module configured to communicate with a mobile terminal is disposed on the keypad circuit board, and the keypad circuit board is connected to the first communication module, which enables the mobile terminal to access the Internet wirelessly.

In an embodiment of the present disclosure, two SIM card holes corresponding to the two SIM card sockets are disposed in the keypad shell.

In an embodiment of the present disclosure, a dustproof cover covers the two SIM card holes, which achieves dust prevention.

In an embodiment of the present disclosure, a connector disposed on a surface of the keypad shell is connected to the first communication module, which enables the mobile terminal to access the Internet by a wired mode and be connected to the keypad.

In an embodiment of the present disclosure, the connector is a pogo pin.

In an embodiment of the present disclosure, the first communication module is a fourth generation of mobile phone mobile communication technology standards (4G) module.

In an embodiment of the present disclosure, the second communication module is selected from a BLUETOOTH module, a WIFI module, and a BLUETOOTH and WIFI module.

Compared to existing technologies, the benefits of the present disclosure are: the two card sockets, and the first communication module supporting all major operators are disposed in the keypad, which enable the keypad to access the Internet when connected to the mobile terminal, and ensure uninterrupted Internet data access by switching to a SIM card of a different operator when a SIM card of the current operator has weak reception.

BRIEF DESCRIPTION OF THE SEVERAL VIEWS OF THE DRAWINGS

The accompanying figures to be used in the description of embodiments of the present disclosure or prior art will be described in brief to more clearly illustrate the technical solutions of the embodiments or the prior art. The accompanying figures described below are only part of the embodiments of the present disclosure, from which figures those skilled in the art can derive further figures without making any inventive efforts.

DESCRIPTION OF SPECIFIC EMBODIMENTS OF THE INVENTION

Figure 1:
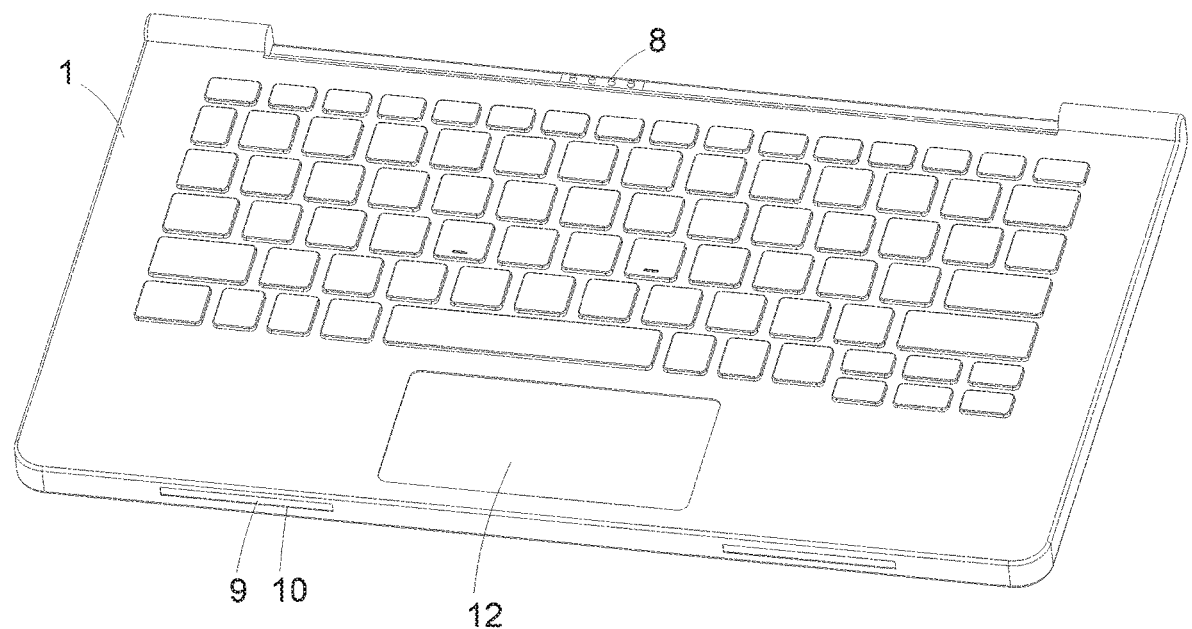
FIG. 1 is an external structural diagram of a keypad according to an embodiment of the present disclosure.

The embodiments of the present disclosure are described in detail hereinafter. Examples of the described embodiments are given in the accompanying drawings, wherein the identical or similar reference numerals constantly denote the identical or similar elements or elements having the identical or similar functions. The specific embodiments described with reference to the attached drawings are all exemplary and are intended to illustrate and interpret the present disclosure, which shall not be construed as causing limitations to the present disclosure.

In the description of the present disclosure, it should be understood that terms such as "center," "longitudinal," "lateral," "length," "width," "thickness," "upper," "lower," "front," "rear," "left," "right," "vertical," "horizontal," "top," "bottom," "inside," "outside," "clockwise," "counterclockwise" as well as derivative thereof should be construed to refer to the orientation as then described or as shown in the drawings under discussion. These relative terms are for convenience of description, do not require that the present disclosure be constructed or operated in a particular orientation, and shall not be construed as causing limitations to the present disclosure. In addition, terms such as "first" and "second" are used herein for purposes of description and are not intended to indicate or imply relative importance or significance. Thus, features limited by "first" and "second" are intended to indicate or imply including one or more than one these features. In the description of the present disclosure, "a plurality of" relates to two or more than two, unless otherwise specified.

In the description of the present disclosure, it should be noted that unless there are express rules and limitations, the terms such as "mount," "connect," and "bond" should be comprehended in broad sense. For example, it can mean a permanent connection, a detachable connection, or an integrate connection; it can mean a mechanical connection, an electrical connection, or can communicate with each other; it can mean a direct connection, an indirect connection by an intermediate, or an inner communication or an interreaction between two elements. A person skilled in the art should understand the specific meanings in the present disclosure according to specific situations.

In the description of the present disclosure, unless specified or limited otherwise, it should be noted that, a structure in which a first feature is "on" or "beneath" a second feature may include an embodiment in which the first feature directly contacts the second feature and may also include an embodiment in which an additional feature is formed between the first feature and the second feature so that the first feature does not directly contact the second feature. Furthermore, a first feature "on," "above," or "on top of" a second feature may include an embodiment in which the first feature is right "on," "above," or "on top of" the second feature and may also include an embodiment in which the first feature is not right "on," "above," or "on top of" the second feature, or just means that the first feature has a sea level elevation greater than the sea level elevation of the second feature. While first feature "beneath," "below," or "on bottom of" a second feature may include an embodiment in which the first feature is right "beneath," "below," or "on bottom of" the second feature and may also include an embodiment in which the first feature is not right "beneath," "below," or "on bottom of" the second feature, or just means that the first feature has a sea level elevation less than the sea level elevation of the second feature.

The disclosure herein provides many different embodiments or examples for realizing different structures of the present disclosure. In order to simplify the disclosure of the present disclosure, components and settings of specific examples are described below. Of course, they are only examples and are not intended to limit the present disclosure. Furthermore, reference numbers and/or letters may be repeated in different examples of the present disclosure. Such repetitions are for simplification and clearness, which per se do not indicate the relations of the discussed embodiments and/or settings. Moreover, the present disclosure provides examples of various specific processes and materials, but the applicability of other processes and/or application of other materials may be appreciated by a person skilled in the art.

Figure 2:
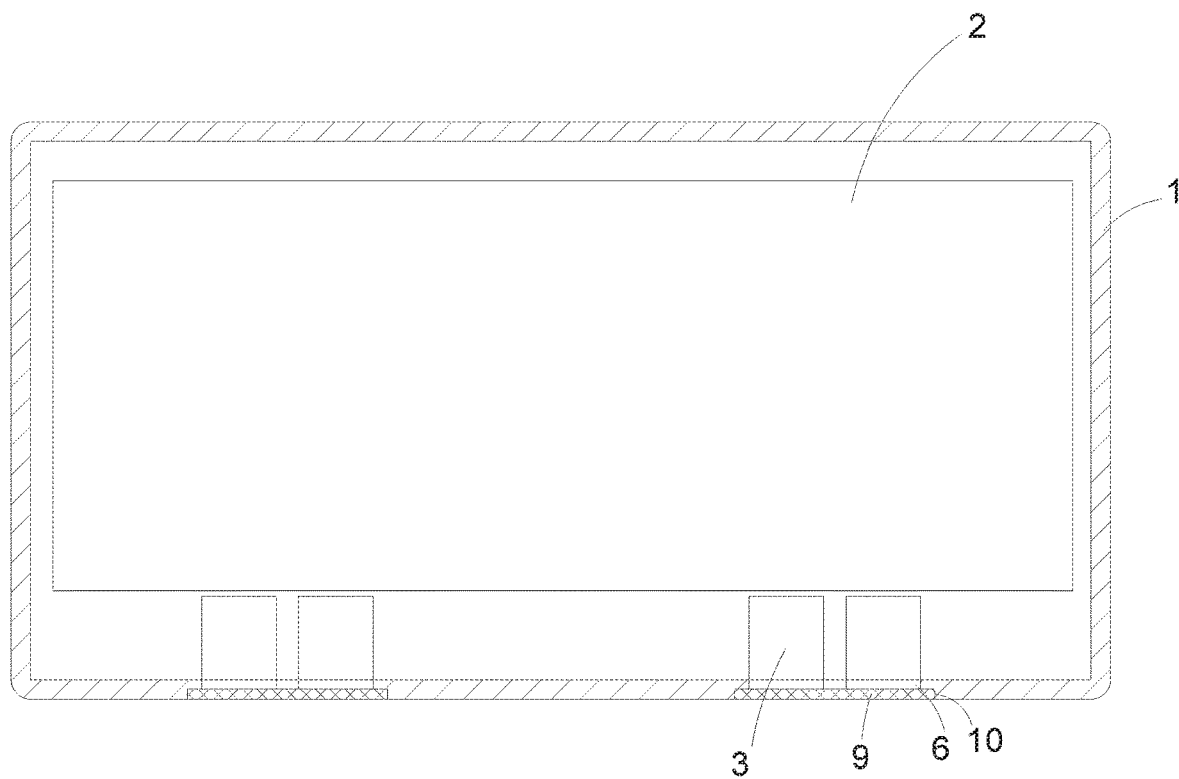
FIG. 2 is an internal structural diagram of a keypad according to an embodiment of the present disclosure.
Figure 3:
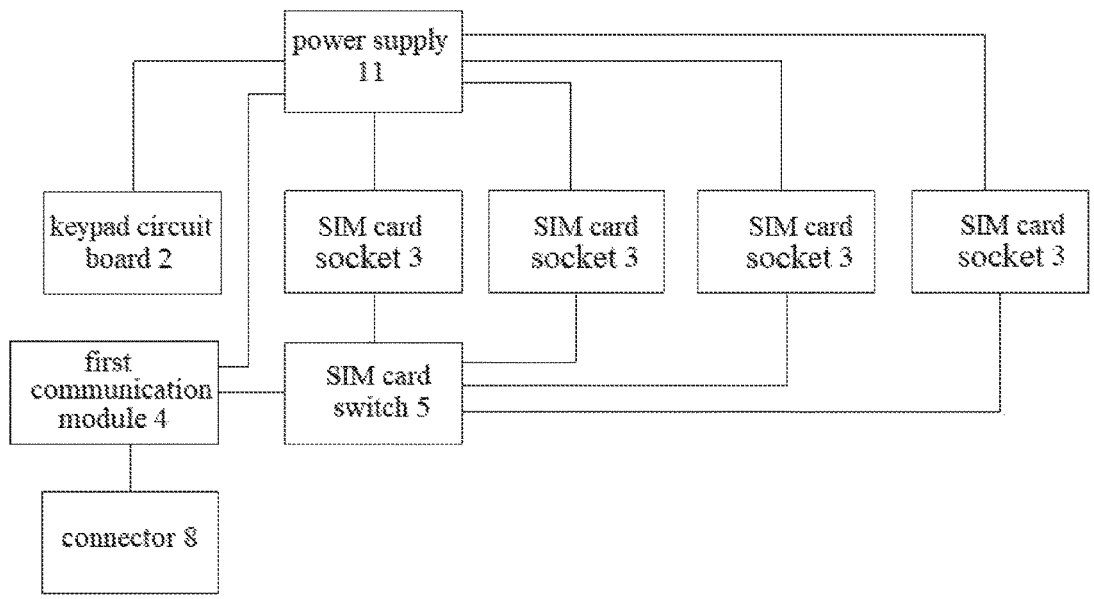
FIG. 3 is a first block diagram of a keypad according to an embodiment of the present disclosure.

Referring to FIG. 1, FIG. 2, and FIG. 3, an embodiment of the present disclosure provides a first keypad. The keypad includes a keypad shell 1, and a keypad circuit board 2 disposed inside the keypad shell 1. The keypad circuit board 2 is an existing keypad circuit board with functions of a wired connection or a wireless connection. At least two subscriber identity module (SIM) card sockets 3, and a first communication module 4 configured to access the Internet and connected to the SIM card sockets 3 are disposed in the keypad shell 1. A SIM card switch 5 is coupled between the first communication module 4 and the SIM card sockets 3. The first communication module 4 is connected to the keypad circuit board 2. The SIM card switch 5 can be an existing dual SIM card switching circuit, or the SIM card switch 5 can switch by a conventional selective switch, not limited here. The SIM card sockets 3 disposed in the keypad shell 1 are corresponding to an equal number of SIM card holes 6 disposed in the keypad shell 1. Specifically, the SIM card holes 6 are disposed on an edge of a backend of the keypad shell 1. In an embodiment of the present disclosure, four SIM card sockets 3 are divided into two pairs, and the two pairs are correspondingly disposed on left and right edges of the backend of the keypad shell 1. At least two SIM card sockets 3 are disposed in the keypad shell 1, which enable a SIM card of a different operator to access the Internet by switching to the SIM card through the SIM card switch 5 when the current SIM card has weak reception, and ensure expedited communication.

In an embodiment of the present disclosure, the keypad further includes a touchpad configured to realize the function of a mouse. Connection modes of the touchpad belong to existing technologies, not limited here.

A dustproof cover 9 covers the two SIM card holes 6 of each pair. Specifically, referring to FIG. 2, a rectangular hole 10 disposed outside the two SIM card holes 6 of each pair and connected to the two SIM card holes 6 of each pair. The two SIM card holes 6 of each pair are disposed in the rectangular hole 10, and the dustproof cover 9 fits the rectangular hole 10.

In an embodiment of the present disclosure, referring to FIG. 1 and FIG. 3, in the first keypad, a connector 8 disposed on the keypad shell 1 is connected to the first communication module 4. The first communication module 4 is connected to a mobile terminal fitting the connector 8 via the connector 8, which ensures the mobile terminal to access the Internet by a wired or wireless mode and realizes data interaction. The mobile terminal exchanges data with the keypad by the wireless mode above, which avoids crosstalk problems of data interaction.

In a first embodiment of the present disclosure, the keypad can be connected through a wired or wireless mode, and the first communication module 4 can be connected in complementary ways, which prevents crosstalk of data interaction.

Figure 4:
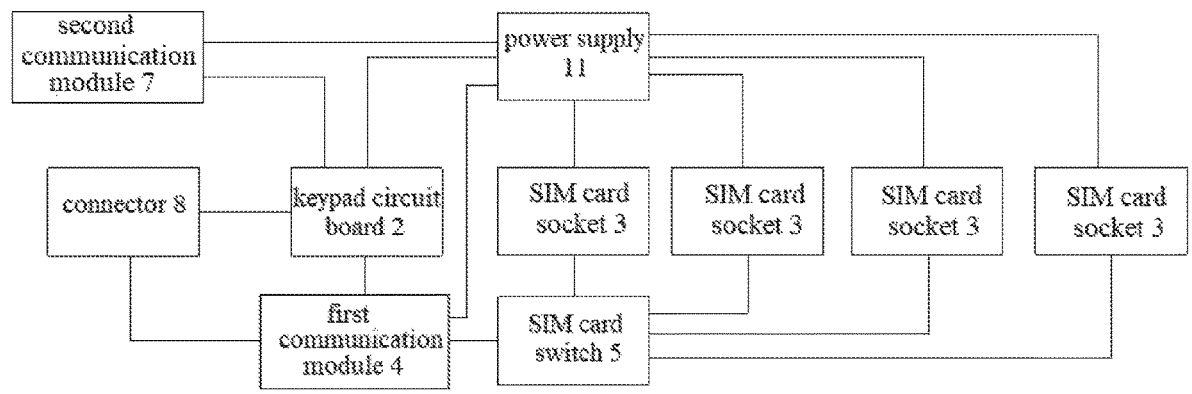
FIG. 4 is a second block diagram of a keypad according to an embodiment of the present disclosure.

Referring to FIG. 1, FIG. 2, and FIG. 4, an embodiment of the present disclosure provides a second keypad. The keypad includes a keypad shell 1, and a keypad circuit board 2 disposed inside the keypad shell 1. The keypad circuit board 2 is an existing keypad circuit board with functions of a wired connection or wireless connection. At least two SIM card sockets 3, and a first communication module 4 configured to access the Internet and connected to the SIM card sockets 3 are disposed in the keypad shell 1. A SIM card switch 5 is coupled between the first communication module 4 and the SIM card sockets 3. The first communication module 4 is connected to the keypad circuit board 2. The SIM card switch 5 can be an existing dual SIM card switching circuit, or the SIM card switch 5 can switch by a conventional selective switch, not limited here. The SIM card sockets 3 disposed in the keypad shell 1 are corresponding to an equal number of SIM card holes 6 disposed in the keypad shell 1. Specifically, the SIM card holes 6 are disposed on an edge of a backend of the keypad shell 1. In an embodiment of the present disclosure, four SIM card sockets 3 are divided into two pairs, and the two pairs are correspondingly disposed on left and right edges of the backend of the keypad shell 1. At least two SIM card sockets 3 are disposed in the keypad shell 1, which enable a SIM card of a different operator to access the Internet by switching to the SIM card through the SIM card switch 5 when the current SIM card has weak reception, and ensure connectivity of the network.

In an embodiment of the present disclosure, the keypad further includes a touchpad configured to realize the function of a mouse. Connection modes of the touchpad belong to existing technologies, not limited here.

A dustproof cover 9 covers the two SIM card holes 6 of each pair. Specifically, referring to FIG. 2, a rectangular hole 10 disposed outside the two SIM card holes 6 of each pair and connected to the two SIM card holes 6 of each pair. The two SIM card holes 6 of each pair are disposed in the rectangular hole 10, and the dustproof cover 9 fits the rectangular hole 10.

The keypad further includes a second communication module 7 connected to the keypad circuit board 2 if the keypad is a wireless keypad, which realizes data interaction with the mobile terminal. The keypad circuit board 2 is connected to the first communication module 4, which enables the mobile terminal to access the Internet wirelessly through the second communication module 7 and the first communication module 4.

In an embodiment of the present disclosure, referring to FIG. 1 and FIG. 4, in the second keypad, a connector 8 disposed on the keypad shell 1 is connected to the keypad circuit board 2 and the first communication module 4. The keypad can exchange data with the mobile terminal through the connector 8 or the second communication module 7, which enables the mobile terminal to access the Internet by a wired or wireless mode and realizes data interaction between the keypad and the mobile terminal.

In the above two keypads, referring to FIG. 3 and FIG. 4, a power supply 11 supplying power to the keypad circuit board 2, the first communication module 4, the second communication module 7, and the SIM card sockets 3 is disposed in the keypad shell 1. The power supply 11 can be a built-in rechargeable battery, not limited here.

In an embodiment of the present disclosure, the first communication module 4 is a fourth generation of mobile phone mobile communication technology standards (4G) module, specifically, a 4G module supporting networks of all operators. The second communication module 7 is selected from a BLUETOOTH module, a WIFI module, and a BLUETOOTH and WIFI module. The first communication module 4 and the second communication module 7 are intelligent modules integrated 4G modules, WIFI modules, and BLUETOOTH modules, such as the ANDROID intelligent module of CLM830 model produced by Shanghai Yuge information technology limited company, or the intelligent module of LTE SC20 model produced by Shanghai quecte communication technology limited-liability company. The connector 8 is a pogo pin. Correspondingly, a pogo pin corresponding to the connector 8 is disposed in the mobile terminal.

In an embodiment of the present disclosure, opening the dustproof cover 9, installing SIM cards of different operators to the SIM card sockets 3 through the SIM card holes, and covering the dustproof cover 9 before using the keypad, which ensures integral aesthetics of the keypad shell 1. The keypad can switch to a network of the wanted operator through the SIM card switch 5, and the mobile terminal can access the Internet wirelessly through the connector 8 or the second communication module 7. The SIM card sockets 3 can be switched through the SIM card switch 5 to ensure expedited communication when the current SIM card has weak reception.

The present disclosure has been described with a preferred embodiment thereof. The preferred embodiment is not intended to limit the present disclosure, and it is understood that many changes and modifications to the described embodiment can be carried out without departing from the scope and the spirit of the disclosure that is intended to be limited only by the appended claims.

What is claimed is:

1. A keypad, comprising:
a keypad shell; and
a keypad circuit board disposed inside the keypad shell;
two subscriber identity module (SIM) card sockets disposed in the keypad shell;
a first communication module configured to access the Internet and connected to the two SIM card sockets;
a SIM card switch is coupled between the first communication module and the two SIM card sockets;
a connector disposed on a surface of the keypad shell and connected to the keypad circuit board and the first communication module, wherein the first communication module is connected to a mobile terminal fitting the connector via the connector to allow the mobile terminal to access the Internet via the first communication module; and
a second communication module configured to communicate with the mobile terminal and connected to the keypad circuit board, wherein the keypad circuit board is connected to the first communication module to allow the mobile terminal to access the Internet wirelessly through the second communication module and the first communication module;
wherein a dustproof cover covers two SIM card holes disposed in the keypad shell and corresponding to the two SIM card sockets, and a rectangular hole disposed outside the two SIM card holes and connected to the two SIM card holes fits the dustproof cover.

2. The keypad according to claim 1, wherein the connector is a pogo pin.

3. The keypad according to claim 1, wherein the first communication module is a fourth generation of mobile phone mobile communication technology standards (4G) module.

4. The keypad according to claim 1, wherein the second communication module is selected from a BLUETOOTH module, a WIFI module, and a BLUETOOTH and WIFI module.

5. The keypad according to claim 1, wherein the two SIM card holes are disposed on an edge of a backend of the keypad shell.

6. A keypad, comprising:
a keypad shell; and
a keypad circuit board disposed inside the keypad shell;
two subscriber identity module (SIM) card sockets disposed in the keypad shell;
a first communication module configured to access the Internet and connected to the two SIM card sockets;
a SIM card switch is coupled between the first communication module and the two SIM card sockets; and
a connector disposed on a surface of the keypad shell and connected to the keypad circuit board and the first communication module, wherein the first communication module is connected to a mobile terminal fitting the connector via the connector to allow the mobile terminal to access the Internet via the first communication module.

7. The keypad according to claim 6, wherein two SIM card holes corresponding to the two SIM card sockets are disposed in the keypad shell.

8. The keypad according to claim 7, wherein a dustproof cover covers the two SIM card holes.

9. The keypad according to claim 7, wherein the two SIM card holes are disposed on an edge of a backend of the keypad shell.

10. The keypad according to claim 9, wherein the connector is a pogo pin.

11. The keypad according to claim 10, wherein the first communication module is a fourth generation of mobile phone mobile communication technology standards (4G) module.

12. A keypad, comprising:
a keypad shell; and
a keypad circuit board disposed inside the keypad shell;
two subscriber identity module (SIM) card sockets disposed in the keypad shell;
a first communication module configured to access the Internet and connected to the two SIM card sockets;
a SIM card switch is coupled between the first communication module and the two SIM card sockets;
a connector disposed on a surface of the keypad shell and connected to the keypad circuit board and the first communication module, wherein the first communication module is connected to a mobile terminal fitting the connector via the connector to allow the mobile terminal to access the Internet via the first communication module; and
a second communication module configured to communicate with the mobile terminal and connected to the keypad circuit board, wherein the keypad circuit board is connected to the first communication module to allow the mobile terminal to access the Internet wirelessly through the second communication module and the first communication module.

13. The keypad according to claim 12, wherein two SIM card holes corresponding to the two SIM card sockets are disposed in the keypad shell.

14. The keypad according to claim 13, wherein a dustproof cover covers the two SIM card holes.

15. The keypad according to claim 12, wherein the connector is a pogo pin.

16. The keypad according to claim 12, wherein the first communication module is a fourth generation of mobile phone mobile communication technology standards (4G) module.

17. The keypad according to claim 12, wherein the second communication module is selected from a BLUETOOTH module, a WIFI module, and a BLUETOOTH and WIFI module.

* * * * *